J. J. CHAPIN.
MOTOR CYCLE.
APPLICATION FILED JULY 17, 1911.
1,077,974.
Patented Nov. 11, 1913.
3 SHEETS—SHEET 2.
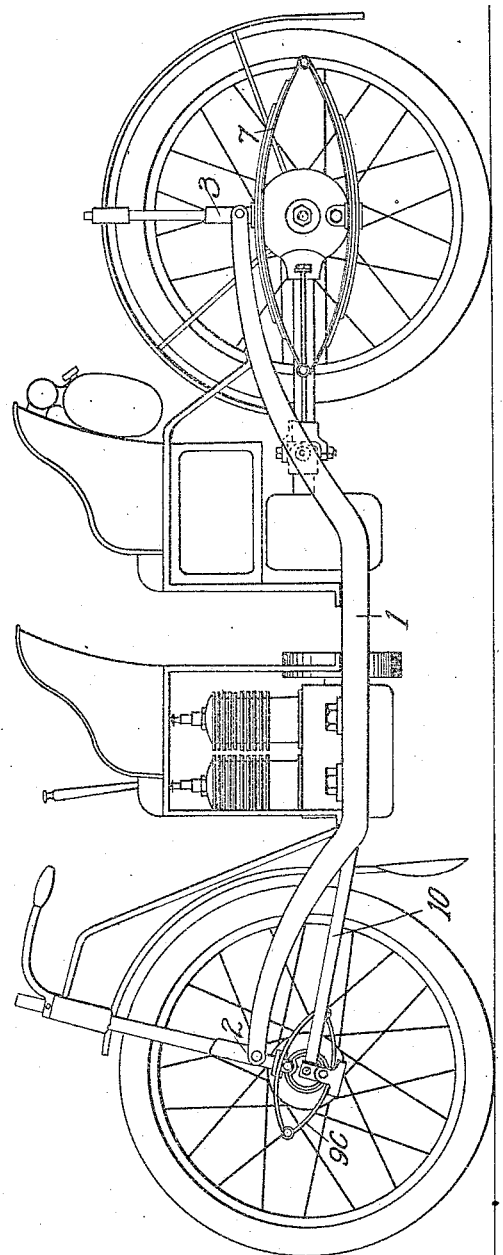
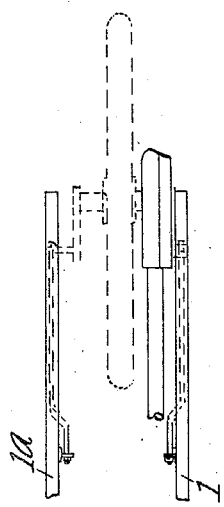
Witnesses
Inventor
John J. Chapin
By Parker T. Burton
Attorney

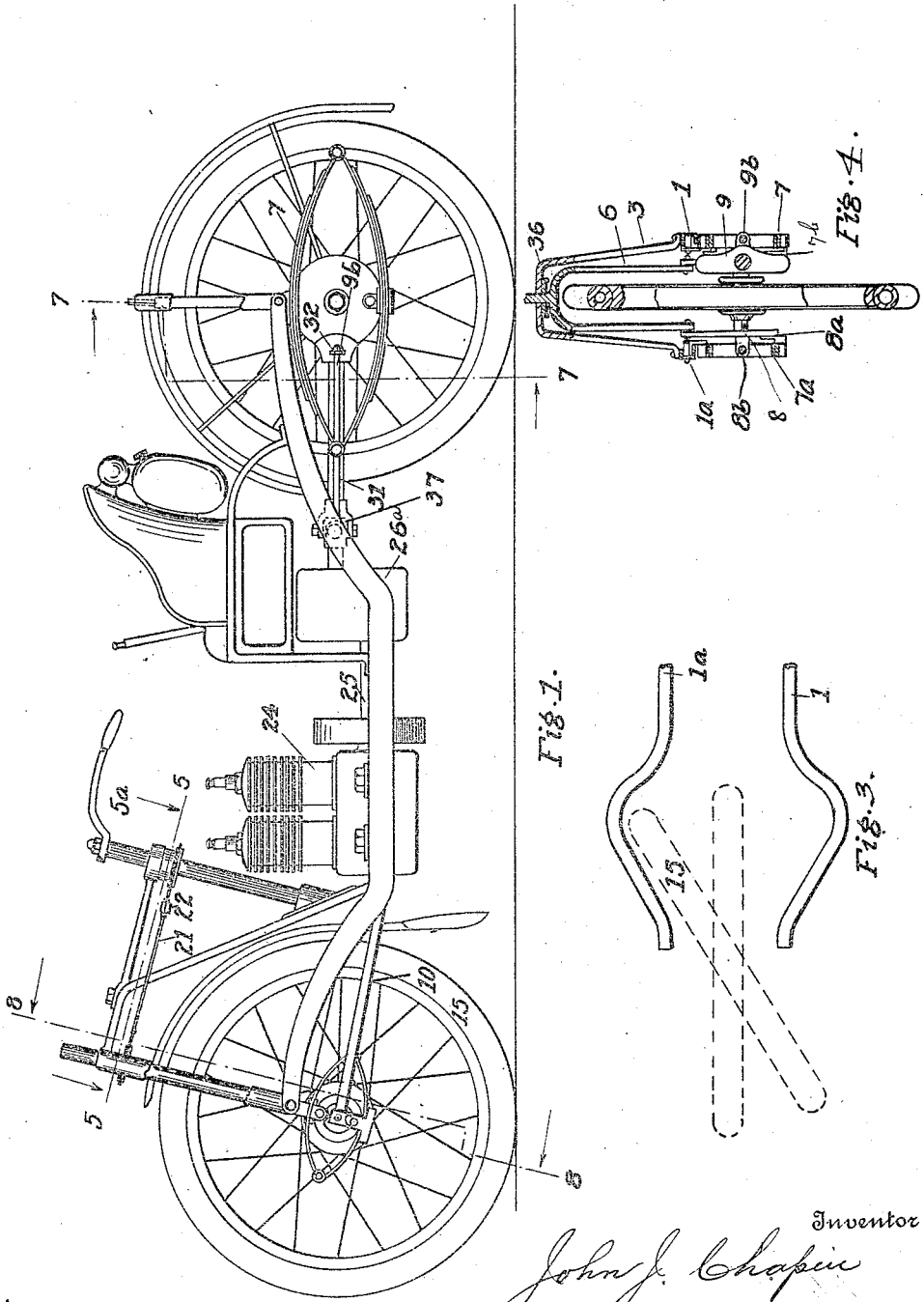

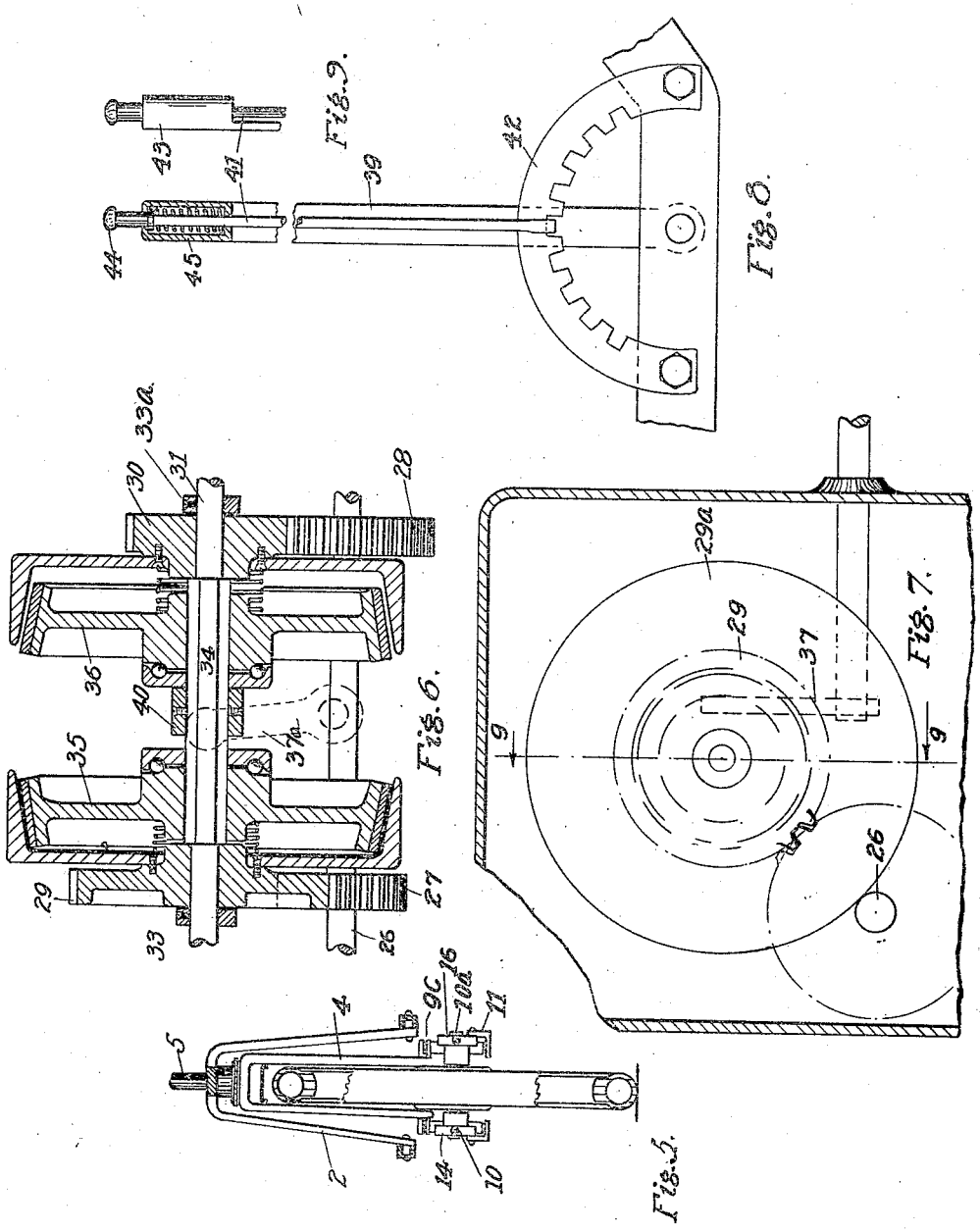

UNITED STATES PATENT OFFICE.

JOHN J. CHAPIN, OF DETROIT, MICHIGAN.

MOTOR-CYCLE.

1,077,974. Specification of Letters Patent. Patented Nov. 11, 1913.

Application filed July 17, 1911. Serial No. 638,832.

*To all whom it may concern:*

Be it known that I, JOHN J. CHAPIN, a citizen of the United States, residing at Detroit, county of Wayne, State of Michigan, have invented a certain new and useful Improvement in Motor-Cycles, and declare the following to be a full, clear, and exact description of the same, such as will enable others skilled in the art to which it pertains to make and use the same, reference being had to the accompanying drawings, which form a part of this specification.

This invention relates to motor cycles.

It has for its object improvements in the details of the frame construction and mountings of a motor cycle.

In the drawings: Figure 1, is a side elevation of a motorcycle supporting a single seat. Fig. 2, is a side elevation of a motorcycle supporting two seats. Fig. 3, is a diagram of a detail of the connection of the front wheel to the frame. Fig. 4, is a vertical section on the line 7—7 of Fig. 1. Fig. 5, is a vertical cross section of front wheel taken at the broken line 8—8 of Fig. 1. Fig. 6, is a sectional detail of the clutch connection showing a variable gear connection in the transmission. Fig. 7, is a side view of the variable gear of Fig. 6. Fig. 8, is a side elevation, partly in section, of the quadrant. Fig. 9, is a side elevation of the top end of the quadrant lever. Fig. 10, is a plan view showing the connection of the rear wheel to the frame.

The form shown in Fig. 2, differs from the form shown in Fig. 1, only that a second rider's seat is mounted over the engine on the frame. The auxiliary steering post is removed and the steering mechanism transferred directly to the vertical oscillating member of the front fork.

The frame comprises two side bars 1 and 1ª which join a yoke 2 that straddles the front wheel and a yoke 3 that straddles the rear wheel. A fork 4 which straddles the front wheel terminates at the lower end of the steering post 5. This steering fork 4 serves to maintain the front wheel in alinement with the frame by the engagement of the steering post 5 through the upper end of the yoke 2. At the rear the stem of a fork 6 engages through the cross bar 3ᶜ of the yoke 3 which couples the side bars 1 1ª; the side bars 1, 1ª rest on springs 7 7ª, which are themselves supported on brackets secured to members 8 and 9; of these members 8 is a tie plate which carries one end of the wheel axle and couples fork 6 and the spring 7ª; the member 9 is also a tie member but it is hollow and houses the driving gears (not shown); it couples the fork 6 with the other spring 7. The main frame is thus connected to the wheel with the wheel in proper alinement, but with freedom of spring action in a vertical direction. The under leaves of the spring 7 rest on a bracket 7ᵇ which is secured to the gear housing 9 which serves as a hanger to support the axle bearing. On the opposite side of the rear wheel the under leaves of the spring 7ª rest on a bracket 8ª on axle bearing. The gear case 9 and the tie plate 8 are connected by radius rods 8ᵇ 9ᵇ to the side bars. The rear wheel hub and its connection with the axle are of ordinary construction and need not be particularly described.

The front wheel hub is arranged for the oscillation of the wheel on its axle and the frame is made so that the frame bars 1 and 1ª extend from the front fork 4 to the rear fork 6 in rigid arrangement, supported at the rear end on springs 7 and 7ª and supported at the front end by the fork 2, that is supported on the front wheel axle by the springs 9ᶜ, with radius rod connections 10, 10ª from the frame to the front wheel axle. The side bars 1 and 1ª are bent and spread near their front ends to enable the wheel 15 to oscillate on its axle for steering purposes, as is indicated in Fig. 3. The radius rod 10 connects the coupling 14 that is attached to the front axle to the side bar 1 and the radius rod 10ª connects the coupling 16 that is attached to the other end of the front axle, to the side bar 1ª. The couplings 14 and 16 are arranged so that the front wheel may oscillate as well as turn on its axis, but as this is not claimed as part of my invention, it is not shown in the drawings otherwise than as in Fig. 3. The yoke member 2 remains stationary, held to the end of the frame members 1 and 1ª and the radius rods 10 and 10ª maintain their relation with respect to the side members 1 and 1ª as to horizontal oscillation but are adapted to have some vertical oscillation because of the spring interposed between them and the fork 4. The post 5 is the primary steering post and in the form shown in Fig. 1 where the machine is adapted for a single rider an auxiliary post 5ᵃ is erected and a wheel mounted on the post 5 is connected to the sprocket wheel mounted on the post 5ᶜ by chain 21; these wheels are only adapted for oscillation and not complete rotation and the chain 21 is made in two short chain pieces connected by long rods having turnbuckles 22.

An engine 24 is mounted between the side bars 1 and 1ᵃ in suitable arrangement with reference to the wheels and the seats; its shaft 25 projects into the transmission casing 26ᵃ in which there is contained a variable speed transmission consisting of two wheels 27 and 28 fixedly mounted on the shaft 26 and gearing with wheels 29 and 30 loosely mounted on a counter shaft 31, which counter shaft 31 extends to a universal joint 37 and thence to the rear and drives the bevel gear 32 that drives the rear wheel. The wheels 29 and 30 rotate freely on the shaft 31, but are held against movement along the axis thereof by collars 33 and 33ᵃ. The shaft between the wheels 29 and 30 is formed into a prismatic section 34 on which are a pair of sliding cone clutch members 35 and 36; on the wheel 29 is a hollow cone clutch member and on the wheel 30 is a hollow cone clutch member; between the wheels 35 and 36 is a thrust arm 37ᵃ controlled by quadrant arm 39. Between the clutch members 35 and 36 on the prismatic section 34 is a stop block 40. The wheel 29 is larger in diameter than the wheel 27 and when the cone clutch 35 is brought into clutch engagement with the hollow cone on the wheel 29, a slow transmission movement is given from the engine to the rear wheel. The wheels 30 and 28 are so proportioned that when the clutch 36 is brought into engagement with the hollow clutch on the wheel 30 there is a faster transmission. At the intermediate point when both clutches are out of engagement and the quadrant arm 39 is in a vertical position, there is no transmission from the engine to the driving wheel.

A latch arm 41 extends from the quadrant 42 through an auxiliary terminal 43 at the top of the quadrant arm and the engagement between the latch arm 41 and the quadrant is disengaged by pressing down the terminal 44, the engagement remakes under the action of the spring 45 when pressure is removed.

There are elliptic spring connections at both the front end of the frame and at the rear end of the frame between the frame and the wheels; there are rigid connections between the side bars of the frame and the vertical members thereof which comprise the forks straddling both the front and the rear wheels. There are seats instead of saddles for one or more riders, variable speed transmission arrangement for maintaining the vehicle in a state of rest while the engine is in operation, and arrangements for changing the speed between its limit of low speed and its limit of high speed while the engine is in operation, all of which features are extremely useful and the details for the accomplishment of which are novel.

What I claim is:—

1. In a frame for motor vehicles, the combination with a pair of frame bars, of a yoke attached to said frame bars, a pair of springs supporting the frame bars and yoke, a fork slidable vertically in said yoke, a wheel straddled by the yoke and fork, an axle upon which the wheel turns, the said axle being connected with the springs so that the latter act as a yielding medium between the axle and the frame bars and a radius rod attached to a frame bar and connecting with the axle, substantially as described.

2. In a frame for motor vehicles, the combination of a pair of frame bars, a yoke having its ends attached to the ends of the frame bars, a fork reciprocable through said yoke, a wheel straddled by the yoke and fork, a pair of elliptical springs, one on each side of the wheel and supporting at the center of its upper half the ends of the frame bar and yoke, an axle upon which the wheel turns, a driving gear housing rotatively mounted upon the axle and connected to the end of one of the tines of the fork and a tie plate connected to the end of the other tine and to the axle, the said lower halves of the elliptical springs being connected one to the driving-gear housing and the other to the tie plate, substantially as described.

In testimony whereof I sign this specification in the presence of two witnesses.

JOHN J. CHAPIN.

Witnesses:
 CHARLES F. BURTON,
 VIRGINIA C. SPRATT.